E. C. FRISK & E. C. ANDERSON.
UTENSIL KNOB.
APPLICATION FILED MAY 28, 1913.
1,099,033.
Patented June 2, 1914.
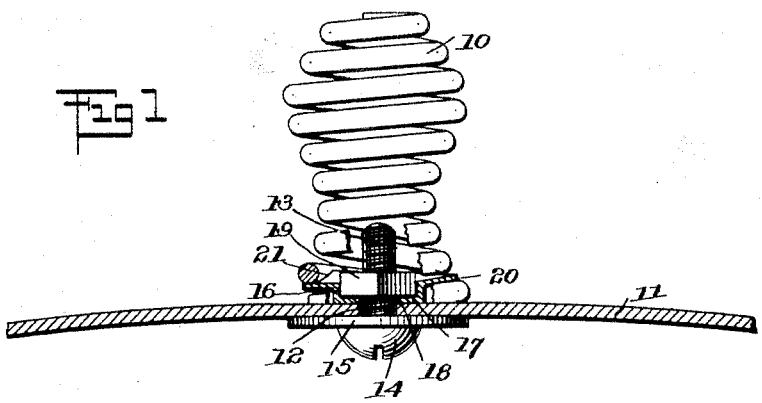
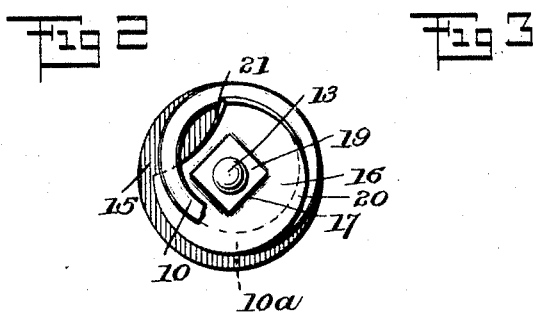
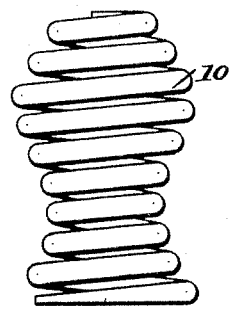
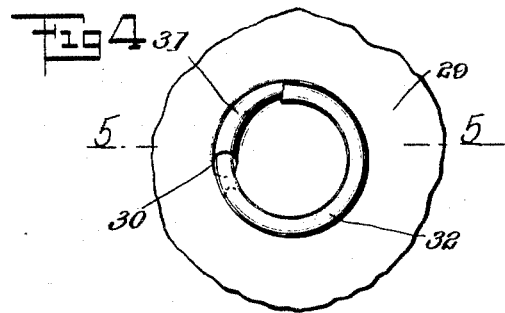
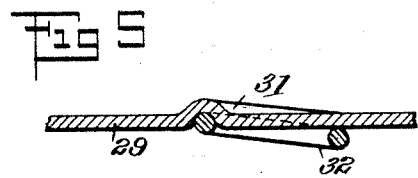
WITNESSES
INVENTORS
Enos C. Frisk
Edward C. Anderson
BY
ATTORNEYS

UNITED STATES PATENT OFFICE.

ENOS CORNELIUS FRISK AND EDWARD CHRISTIAN ANDERSON, OF SOMERSET, WISCONSIN.

UTENSIL-KNOB.

1,099,033.  Specification of Letters Patent.  Patented June 2, 1914.

Application filed May 28, 1913. Serial No. 770,342.

*To all whom it may concern:*

Be it known that we, ENOS C. FRISK and EDWARD C. ANDERSON, both citizens of the United States, and both residents of Somerset, in the county of St. Croix and State of Wisconsin, have invented a new and Improved Utensil-Knob, of which the following is a full, clear, and exact description.

The invention relates to knobs for use with cooking utensils and the like, and has reference more particularly to a device of this class which comprises a knob proper, fashioned from an elongated spirally disposed member, and means for attaching said member directly to the utensil or body.

The object of the invention is to provide a simple, inexpensive and durable knob which can be used with cooking vessels or other utensils, which is so formed that it can be readily gripped and held to manipulate the utensil or part thereof with which the knob is associated, to which the heat from the utensil will not be easily transmitted so that the user will not burn the fingers in grasping the knob, which can be readily attached to any utensil or part thereof, which will not easily wear loose, and which will not detract from the appearance or add materially to the weight of the utensil.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a vertical section of a part of the utensil having an embodiment of our invention attached thereto; Fig. 2 is a fragmentary plan view of the knob; Fig. 3 is a side elevation of the knob alone without its attaching means; Fig. 4 is a fragmentary plan view of a part of the utensil showing a modified form of our invention associated therewith; and Fig. 5 is a transverse section on the line 5—5 of Fig. 4.

Before proceeding to a more detailed explanation of our invention, it should be clearly understood that the knob itself is fashioned from wire or other suitable elongated material, and is bent into spiral form of any desired proportions and shape so that it affords a convenient grip. Prefer-ably the upper part of the knob proper is enlarged relatively to the lower or intermediate portion thereof as is clearly shown in the drawing. The knob may be attached to a utensil itself or a cover or the like. In any event, it is fastened directly to the material thereof by the securing devices which will be hereinafter described. While we have shown the knob body preferably fashioned in the form of a spiral, this may be of other construction provided it has at the lower part thereof an arcuate or similarly disposed member with which the attaching or securing means can coöperate.

Referring more particularly to the drawings, Figs. 1, 2 and 3, we have shown a knob comprising a body 10 of spirally disposed wire having the lower extremity thereof flattened or tapered. The body seats directly against the utensil wall 11 which consists of sheet metal or the like. It is provided with an opening 12 therethrough which receives a suitable threaded screw 13 having a slotted head 14 by means of which it can be manipulated. At the under side of the part 11 of the utensil is provided a washer disk 15 through which the screw passes and against which the head of the screw rests. We provide a socket plate 16 having a substantially central recess 17 and an opening 18 through which the screw 13 passes. A nut 19 threaded to receive the screw is positioned in the socket which is of angular form for the purpose. The socket itself has its periphery 20 disposed between adjacent coils at the lower end of the knob and has a part 21 cut away to permit its being so placed between the coils as is shown in Fig. 2.

It will be seen that the socket plate bears directly against the top surface of the part 11, the nut 19 being held against turning as long as the plate cannot turn. By tightening the screw, the nut and the socket plate will be drawn down against the surface of the part 11 and at the same time, the washer will be pressed tightly against the under surface. The socket plate will be held against turning by the engagement thereof with the coils as well as by its frictional contact with the adjacent members. In this way the knob can be securely attached to the utensil. At the same time it should be noted that the knob is directly fastened to the utensil and bears against it, thus insuring a secure and permanent connection and minimizing the possibility of having the knob wear loose. By tapering the lower end 11 of the knob body, it is possible to position the cutaway part of the socket plate under the next adjacent coil, as is shown in Fig. 1 at the left hand side.

In Figs. 4 and 5 is shown a simple modification of our invention which necessitates that the utensil wall 29 be provided with an opening 30 and an arcuate offset or convexity 31, having its greatest depth at the opening 30 and gradually becoming shallower. The body 32 of the knob is likewise of spiral form and has the end coil disposed through the opening 30 and seating in the concavity formed by the offset 31 at the under side of the utensil wall, the lower coil itself, of course, bears directly at the under side of the wall, and the next higher coil against the outer surface. It may be advisable to permanently attach this form of the knob by means of a drop of solder, though this may not be the case. If this is omitted, the knob of course becomes readily attachable or detachable when desired.

Having thus described our invention, we claim as new and desire to secure by Letters Patent:

1. A device of the class described comprising a body fashioned from a spirally disposed elongated member, a socket plate having the edge positioned between two adjacent ends of said member and peripherally cut away at one side, a threaded member provided with a head adapted to attach said body to a utensil, and a nut upon said threaded member and received in said socket plate.

2. A device of the class described comprising a body fashioned from a spirally disposed elongated member, a socket plate having the edge positioned between two adjacoils of said member and peripherally cut away at one side, a threaded member provided with a head adapted to attach said body to a utensil, a nut upon said threaded member and received in said socket plate, and a washer disk having an opening through which said threaded member extends. said socket plate having an angular socket formed to receive said nut, whereby said nut cannot turn unless said socket plate turns.

In testimony whereof we have signed our names to this specification in the presence of two subscribing witnesses.

ENOS CORNELIUS FRISK.
EDWARD CHRISTIAN ANDERSON.

Witnesses:
H. A. LAGRANDEUR,
ROSE E. LAGRANDEUR.